United States Patent
Lewis

(10) Patent No.: US 12,374,148 B2
(45) Date of Patent: Jul. 29, 2025

(54) METHODS AND SYSTEM OF ELECTRONIC IMAGE ANALYSIS

(71) Applicant: Digital Legal Medical Records, LLC, Philadelphia, PA (US)

(72) Inventor: David Lewis, Philadelphia, PA (US)

(73) Assignee: DIGITAL MEDICAL RECORDS, LLC, Philadelphia, PA (US)

(*) Notice: Subject to any disclaimer, the term of this patent is extended or adjusted under 35 U.S.C. 154(b) by 79 days.

(21) Appl. No.: 17/855,495

(22) Filed: Jun. 30, 2022

(65) Prior Publication Data
US 2023/0126977 A1 Apr. 27, 2023

Related U.S. Application Data

(63) Continuation of application No. 17/566,446, filed on Dec. 30, 2021, now abandoned.
(Continued)

(51) Int. Cl.
*G06V 30/414* (2022.01)
*G06F 40/109* (2020.01)
(Continued)

(52) U.S. Cl.
CPC .......... *G06V 30/414* (2022.01); *G06F 40/109* (2020.01); *G06F 40/169* (2020.01); *G06F 40/197* (2020.01); *G06N 20/00* (2019.01)

(58) Field of Classification Search
CPC .... G06V 30/414; G06V 10/82; G06V 30/222; G06V 30/226; G06F 40/109;
(Continued)

(56) References Cited

U.S. PATENT DOCUMENTS

| 6,441,824 B2 * | 8/2002 | Hertzfeld | G06F 40/109 |
| | | | 345/685 |
| 7,764,830 B1 * | 7/2010 | Wnek | G06V 30/1444 |
| | | | 382/159 |

(Continued)

OTHER PUBLICATIONS

B. M. Garlapati and S. R. Chalamala, "A System for Handwritten and Printed Text Classification," 2017 UKSim-AMSS 19th International Conference on Computer Modelling & Simulation (UKSim), Cambridge, UK, 2017, pp. 50-54, doi: 10.1109/UKSim.2017.37. (Year: 2017).*

(Continued)

*Primary Examiner* — Andrae S Allison
(74) *Attorney, Agent, or Firm* — Armstrong Teasdale LLP

(57) ABSTRACT

A machine translation of a document is created via a compilation of services by mapping textual content from an image to create a plurality of mapped locations correspondent to at least one object from the image, populating each of the mapped locations with at least one character indicative of the object, each character sharing at least one similar attribute, adding to the image the populated mapped locations, and highlighting at least a portion of the textual content in accordance with the populated at least one character. A compilation of services is provided for identifying, extracting, and assessing electronic images by using a layered approach that reduces time and improves reviewing of medical records and other kinds of documentation.

15 Claims, 13 Drawing Sheets

Related U.S. Application Data

(60) Provisional application No. 63/240,333, filed on Sep. 2, 2021, provisional application No. 63/195,598, filed on Jun. 1, 2021.

(51) Int. Cl.
    *G06F 40/169* (2020.01)
    *G06F 40/197* (2020.01)
    *G06N 20/00* (2019.01)

(58) Field of Classification Search
    CPC ..... G06F 40/169; G06F 40/197; G06N 20/00; G06N 3/04; G06N 3/08
    See application file for complete search history.

(56) References Cited

U.S. PATENT DOCUMENTS

| | | | |
|---|---|---|---|
| 10,049,097 | B1 | 8/2018 | Gopalakrishnan et al. |
| 10,108,815 | B2 | 10/2018 | Korneev |
| 10,970,580 | B2 | 4/2021 | Nakatsuka |
| 2001/0055020 | A1* | 12/2001 | Hertzfeld ............ G06F 40/109 345/472 |
| 2010/0166309 | A1* | 7/2010 | Hull ................. G06F 21/80 707/769 |
| 2012/0278094 | A1* | 11/2012 | Kovacevic ............ G06Q 30/04 705/2 |
| 2014/0237421 | A1* | 8/2014 | Kuhne ................. G06F 40/103 715/800 |
| 2018/0088794 | A1* | 3/2018 | Graham ................ G06F 3/0488 |
| 2018/0217973 | A1* | 8/2018 | Gopalakrishnan ... G06V 30/414 |
| 2019/0102645 | A1* | 4/2019 | Nakatsuka ......... H04N 1/40062 |
| 2021/0004579 | A1* | 1/2021 | Phipps ................. G06V 30/414 |

OTHER PUBLICATIONS

Pashine, Samay, Ritik Dixit, and Rishika Kushwah. "Handwritten digit recognition using machine and deep learning algorithms." arXiv preprint arXiv:2106.12614 (Jun. 2021). (Year: 2021).*

Phung, Tuan Minh, et al. "A machine learning-based approach to Vietnamese handwritten medical record recognition." (2020). (Year: 2020).*

* cited by examiner

FIG. 4

| Billing | Date | Prov. | TX Code | TAX Description | Debt |
|---|---|---|---|---|---|
| 722223952 | 11/29/2017 | RUDON00C | 99203 | NEW PATIENT EXAM DETAILED | $230.00 |
| 722223952 | 11/29/2017 | RUDON00C | 72052 | X-RAYS-COMPLETE/ CERVICAL | $230.00 |
| 722223952 | 11/29/2017 | RUDON00C | 72070 | thoracic x-ray | $130.00 |
| 722223952 | 11/29/2017 | RUDON00C | 72100 | A/P LAT L/P X-RAY'S | $130.00 |
| 722223952 | 11/29/2017 | RUDON00C | 97010 | HOT PACK | $35.00 |
| 722223952 | 11/29/2017 | RUDON00C | G0283 | EMS | $40.00 |
| 722223952 | 2/18/2018 | RUDON00C | IP | Insurance Payment | $0.00 |
| 722223952 | 2/18/2018 | RUDON00C | WO | Office Adjustment/Write-off | $0.00 |

Time of Session: 9:00 am     Others Present During_____ Before/After_____

__X__ Routine Session     _____ Emergency Session     CPT Code: 90791

Items Discussed:

8/17 – 2018                          Issues Discussed:

surgery – was 12                     MRI frees anxiety + depression                 Did 8+y – gluten free (2017) – lots of surgeries

Interventions:

what to do re-contact on daughters help + home

Progress: 1 2 3 4 5 6 7 8 9

FIG. 6

| Page Number | RB Page Accuracy | Original Page Accuracy | Accuracy Difference | Improvement Percentage |
|---|---|---|---|---|
| 2 | 99.00% | 96.00% | 3.00% | 3.13% |
| 3 | 98.00% | 81.00% | 17.00% | 20.99% |
| 4 | 100.00% | 82.00% | 18.00% | 21.95% |
| 5 | 99.00% | 72.00% | 27.00% | 37.50% |
| 6 | 99.00% | 82.00% | 17.00% | 20.73% |
| 7 | 100.00% | 85.00% | 15.00% | 17.65% |
| 8 | 99.00% | 76.00% | 23.00% | 30.26% |
| 9 | 100.00% | 86.00% | 14.00% | 16.28% |
| 10 | 100.00% | 89.00% | 11.00% | 12.36% |
| 11 | 100.00% | 89.00% | 11.00% | 12.36% |
| 12 | 98.00% | 3.00% | 95.00% | 3166.67% |
| 13 | 98.00% | 4.00% | 94.00% | 2350.00% |
| 14 | 99.00% | 5.00% | 94.00% | 1880.00% |
| 15 | 97.00% | 4.00% | 93.00% | 2325.00% |
| 16 | 96.00% | 4.00% | 92.00% | 2300.00% |
| 17 | 96.00% | 25.00% | 71.00% | 284.00% |
| 18 | 98.00% | 19.00% | 79.00% | 415.79% |
| 19 | 96.00% | 22.00% | 74.00% | 336.36% |
| 20 | 100.00% | 4.00% | 96.00% | 2400.00% |
| 21 | 92.00% | 5.00% | 87.00% | 1740.00% |
| 22 | 81.00% | 3.00% | 78.00% | 2600.00% |
| 23 | 82.00% | 3.00% | 79.00% | 2633.33% |
| 24 | 77.00% | 6.00% | 71.00% | 1183.33% |
| 25 | 80.00% | 6.00% | 74.00% | 1233.33% |
| 26 | 83.00% | 6.00% | 77.00% | 1283.33% |
| 27 | 96.00% | 46.00% | 50.00% | 108.70% |
| 28 | 92.00% | 28.00% | 64.00% | 228.57% |

Fig. 9

METHODS AND SYSTEM OF ELECTRONIC IMAGE ANALYSIS

PRIORITY

This application is a continuation of U.S. application Ser. No. 17/566,446 filed on Dec. 30, 2021, which claims the benefit of U.S. Provisional 63/195,598, filed Jun. 1, 2021, and U.S. Provisional 63/240,333, filed Sep. 2, 2021, which are hereby incorporated by reference as if submitted in its entireties.

FIELD OF THE INVENTION

The present invention relates to the identification and assessment of electronic data, and, more particularly, implementing a compilation of technologies using a layered approach for identifying, extracting, and assessing electronic images.

BACKGROUND

Portable document format files, or PDF files, are extremely portable data files across diverse hardware and operating system environments. Documents may then be presented in a manner independent of application software. A PDF file can be created by converting a source data file, such as Microsoft Office files (e.g., .doc, .ppt, .xls), image files (e.g., .PNG, JPEG), text files (.txt) or the like. Typically, PDF files can be created using printing capabilities built into software applications. Further, PDF files can be viewed using so-called PDF viewers. Proprietary software technology, such as Adobe® Acrobat® or Nuance® PDF Converter Professional, for example, provide users with the ability to interact with a PDF through annotating, applying a digital signature, completing interactive forms, or the like. Optical Character Recognition, or OCR, software is typically used to visually scan a document for character data, convert this character data into a standard form and then saved to memory.

Recognition of textual elements, such as handwritten notes or uncommon terms, by traditional OCR methods is inaccurate and unreliable, especially of patient health records and other documentation. It would be advantageous to have technologies implemented to identify and extract information from PDF files in an accurate and expeditious manner.

BRIEF SUMMARY OF THE INVENTION

In an exemplary embodiment, systems and methods may be provided for the identifying, extracting, and assessing of electronic images implementing a layered processing and analysis approach that reduces processing time and improves the reality and usability of electronically translated documents. In particular, the present invention may improve or eliminate manual steps required for identifying and reviewing documents using, in part, artificial intelligence (AI) and machine learning technologies to identify and extract information from images accurately. The present invention can recognize and capture all printed and handwritten content from electronic medical records and other documentation.

In an exemplary embodiment, systems and methods may be provided for the machine translation of a document, the device comprising a processor and a memory communicatively coupled to the processor, wherein the memory stores processor instructions, which, on execution, causes the processor to extract textual content in a first layer of context from an image. Imaging content is extracted in a second layer of context from the image. The present invention may then parse JSON data in the first layer of context and compress the textual content into a third layer of context and creating a first file in accordance with the first and second layers of context and create a second file in accordance with the first and third layers and creating a single unified searchable document from at least a portion of the first file and second file.

In an exemplary embodiment, systems and methods may be provided for the machine translation of a document, the method comprising mapping textual content from an image to create a plurality of mapped locations correspondent to at least one object from the image, populating each of the mapped locations with at least one character indicative of the object, each character sharing at least one similar attribute, adding to the image the populated mapped locations, and highlighting at least a portion of the textual content in accordance with the populated at least one character.

In another exemplary embodiment, a document analysis (DA) computing device for the review of sensitive data records may be provided. The DA computing device may comprise of at least one memory and a hardware processor. The DA computing device may be configured to: receive one or more electronic images associated with one or more users of a plurality of users, identify and extract one or more elements of the one or more electronic images, and create, based on the one or more electronic images and the one or more elements, one or more multi-layered (ML) images that correspond to the one or more electronic images.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

This disclosure is illustrated by way of example and not by way of limitation in the accompanying figure(s). The figure(s) may, alone or in combination, illustrate one or more embodiments of the disclosure. Elements illustrated in the figure(s) are not necessarily drawn to scale. Reference labels may be repeated among the figures to indicate corresponding or analogous elements.

The detailed description makes reference to the accompanying figures in which:

FIG. 4 illustrates an example annotated document generated by the DA system illustrated in FIG. 1;

FIGS. 5A and 5B illustrates an example exported results report generated by the DA system illustrated in FIG. 1;

FIG. 6 illustrates another example annotated document generated by the DA system illustrated in FIG. 1;

FIG. 9 illustrates example accuracy improvement of searchable content of a document by the DA system illustrated in FIG. 1.

DETAILED DESCRIPTION

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

The present embodiments may relate to, inter alia, systems and methods for providing a compilation of services for identifying, extracting, and assessing electronic images, such as PDFs, Word documents, PNGs, JPGs, TIF, or the like. In some embodiments, the systems and methods may implement a layered approach that reduces time and improves the reviewing of records, such as medical records, and different kinds of documentation. Additionally, different technologies may be leveraged that collectively improve or eliminate steps for identifying and reviewing documentation. In one exemplary embodiment, the disclosed methods may be performed by a document analysis (DA) computing device.

Document Analysis Computing System and Platform

Figure 1:
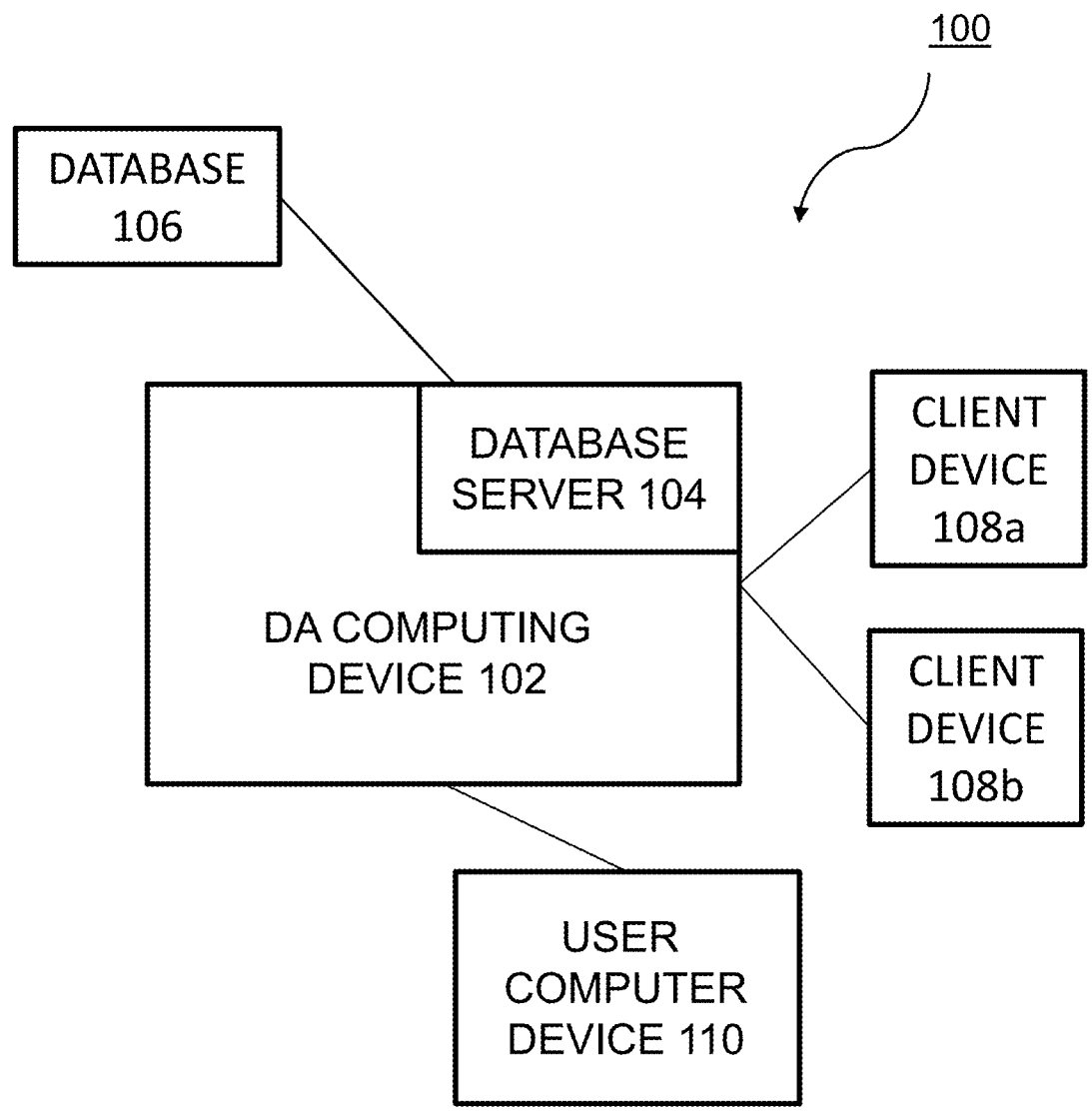
FIG. 1 illustrates a document analysis (DA) system in accordance with an exemplary embodiment of the present disclosure.

FIG. 1 depicts an exemplary document analysis (DA) computing system 100. DA computing system 100 may include a DA computing device 102 (also referred to herein as DA server or DA computer device). DA computing device 102 may include a database server 104. Further, DA computing device 102 may be in communication with, for example, a database 106, one or more client devices 108a and 108b, and a client computing device, such as user computing device 110.

In the exemplary embodiments, client devices 108a and 108b may be computers that include a web browser or a software application, which enables the devices to access remote computer devices, such as DA computing device 102, using the Internet or another type of network. More specifically, client devices 108a and 108b may be communicatively coupled to DA computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Client devices 108a and 108b may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

User device 110 may be a computer that includes a web browser or a software application, which enables user device 110 to access remote computer devices, such as DA computing device 102, using the Internet or other network. In some embodiments, user device 110 may be associated with, or part of a computer network associated with, a medical records company. In other embodiments, user device 110 may be associated with a third party. More specifically, user device 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users (e.g., personal information, medical data), prediction data, third party data, image documents, OCR files, etc. In the exemplary embodiment, database 106 may be stored remotely from DA computing device 102. Additionally, or alternatively, database 106 may be an encrypted drive (e.g., Amazon S3®). In some embodiments, database 106 may be decentralized. In the exemplary embodiment, a user may access database 106 and/or DA computing device 102 via client devices 108a and 108b.

Exemplary Client Computing Device

Figure 2:
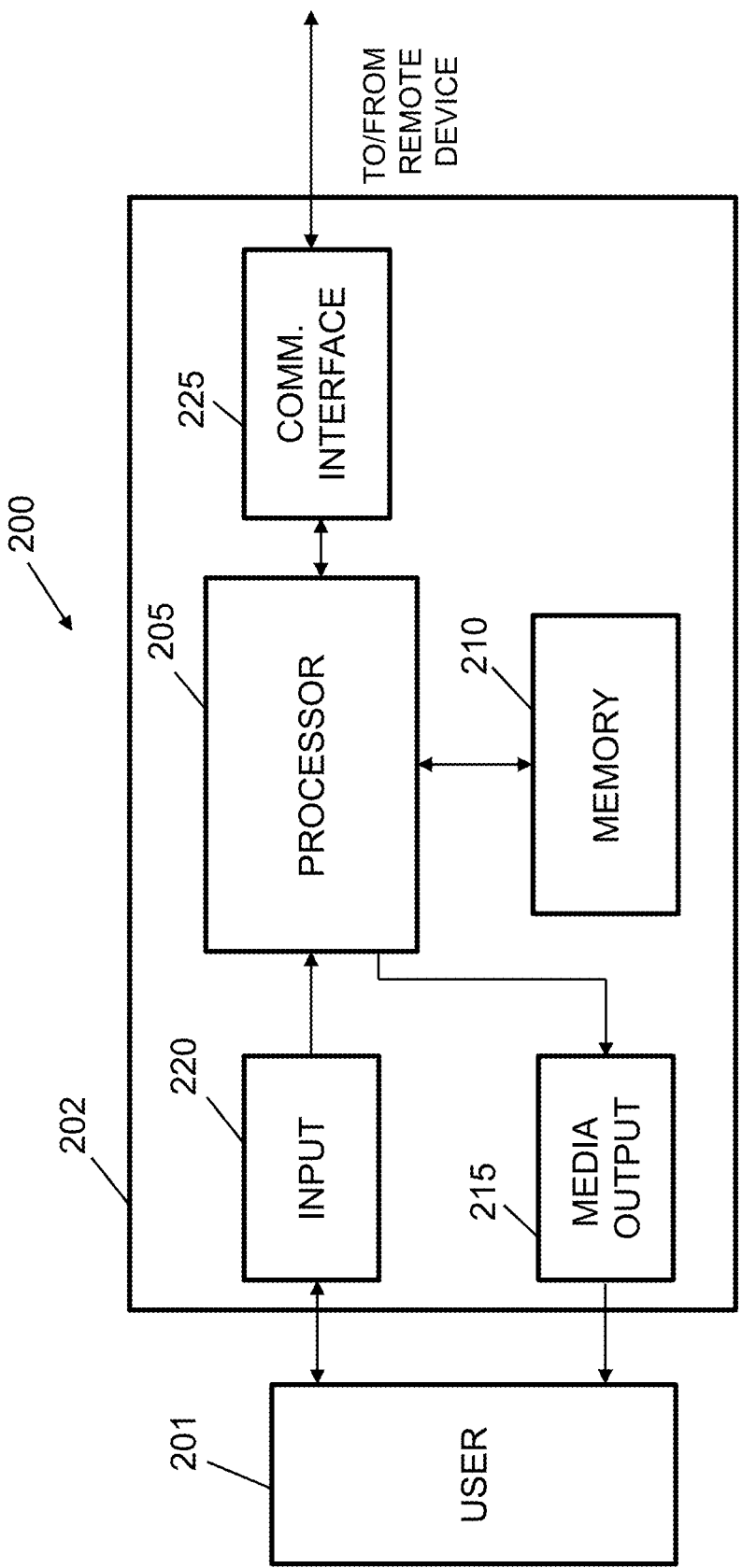
FIG. 2 illustrates an exemplary client computing device that may be used with the DA system illustrated in FIG. 1.

FIG. 2 illustrates a block diagram 200 of an exemplary client computing device 202 that may be used with the document analysis (DA) computing system 100 shown in FIG. 1. Client computing device 202 may be, for example, at least one of devices 108a, 108b, and 110 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, processor 205 may include and/or be communicatively coupled to one or more modules for implementing the systems and methods described herein. For example, in one exemplary embodiment, a module may be provided for receiving data and building a model based upon the received data. Received data may include, but is not limited to, medical information data pertaining to users, medication dosage data, and/or medical treatment data pertaining to users. A model may be built upon this received data, either by a different module or the same module that received the data. Processor 205 may include or be communicatively coupled to another module for generating a OCR prediction data based upon received data pertaining to a user, such as one or more of medical diagnosis, medications, or the like.

In one or more exemplary embodiments, computing device 202 may also include at least one media output component 215 for presenting information a user 201. Media output component 215 may be any component capable of conveying information to user 201. In some embodiments, media output component 215 may include an output adapter such as a video adapter and/or an audio adapter. An output adapter may be operatively coupled to processor 205 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Media output component 215 may be configured to, for example, display a status of the model and/or display a prompt for user 201 to input user data. In another embodiment, media output component 215 may be configured to, for example, display a result of textual data prediction generated in response to receiving user data described herein and in view of the built model.

Client computing device 202 may also include an input device 220 for receiving input from a user 201. Input device 220 may include, for example, a keyboard, a pointing device, a mouse, a stylus, a touch sensitive panel (e.g., a touch pad or a touch screen), a scanner, an image capturing device, or an audio input device. A single component, such as a touch screen, may function as both an output device of media output component 215 and an input device of input device 220.

Client computing device 202 may also include a communication interface 225, which can be communicatively coupled to a remote device, such as LP computing device 102, shown in FIG. 1. Communication interface 225 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 210 may be, for example, computer readable instructions for providing a user interface to user 201 via media output component 215 and, optionally, receiving and processing input from input device 220. A user interface may include, among other possibilities, a web browser or a client application. Web browsers may enable users, such as user 201, to display and interact with media and other information typically embedded on a web page or a website.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAN). The above memory types are exemplary only, and are thus not limiting as to the types of memory usable for storage of a computer program.

Exemplary Server Computing Device

Figure 3:
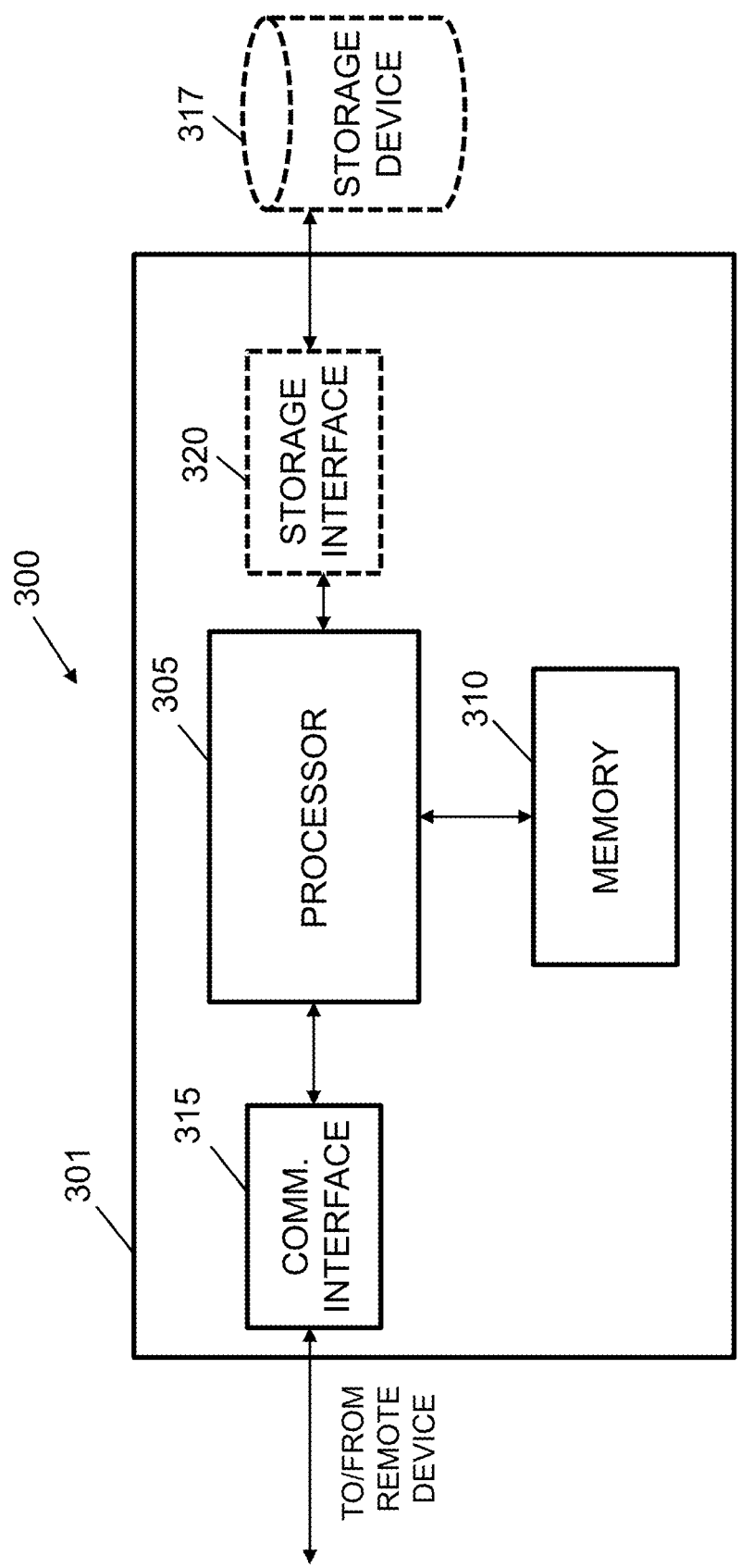
FIG. 3 illustrates an exemplary server system that may be used with the DA system illustrated in FIG. 1.

FIG. 3 depicts a block diagram 300 showing an exemplary server system 301 that may be used with the DA system 100 illustrated in FIG. 1. Server system 301 may be, for example, DA computing device 102 or database server 104 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 can communicate with DA computing device 102, client devices 108a, 108b, and 110 (all shown in FIG. 1), and/or another server system. For example, communication interface 315 may receive data from user devices 108a and 108b via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317. In other embodiments, storage device 317 may be external to server system 301 and may be accessed by a plurality of server systems. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer system.

Identification, Extraction, and Assessment of Documents

In some embodiments, a platform, such as the document analysis (DA) system 100 of FIG. 1, may provide a compilation of services for the extraction and assessment of documents, such as electronic image documents. For example, services provided may include services for identifying, extracting, and assessing electronic documents. Additionally, the platform may utilize a layered approach that reduces time, such as computer processing time, required to accurately review and analyze different types of documentation, such as medical record documentation, or the like.

In some embodiments, the systems and methods described herein may implemented by back-end (e.g., PHP), front-end (e.g., JavaScript), scripting (e.g., BASH) and structured languages (e.g., SQL). The embodiments described are merely exemplary to provide a better understanding of the disclosed. The systems and methods described are in no way limited to these certain languages. Additionally, one or more software extensions may be used, such as Composer packages, jQuery Library, Node.js, Node modules, and Gulp for building and compiling tasks, for example. Additionally, or alternatively, a plurality of third-party services and technologies may be used, such as AWS, Setasign, Pixelcave, and hundreds of Fedora OS packages, for example.

In some embodiments, the DA computing device may use Artificial Intelligence (AI) and/or Machine Learning (ML) technologies to identify and extract information from images. The DA computing device may further recognize and capture printed and handwritten content from electronic records and documentation, such as from electronic medical records, for example.

The DA computing device may provide a plurality of services including, but not limited to, ICD diagnostic and procedure codes, CPT® & HCPCS billing codes, dates and fees, generic and named brand drugs, searching of handwritten text, storage of all textual content in a database, medical devices with model numbers, identify and organize all dates in any format, identify any custom terms or phrases, transcription services, and creation of a highly accurate searchable layer.

Additionally, or alternatively, the DA computing device may provide additional services including, but not limited to, an excel report of all drugs ordered by the doctor, an excel chronology of medical events, a comparison of billing ledgers to Medicare RVUs, privilege log searching, identification of poor-quality pages, web-based real-time reporting, long-term storage and retrieval of records, and custom programming services. In some embodiments, a confidence score may be calculated to provide a score of text identification quality.

Figure 4:
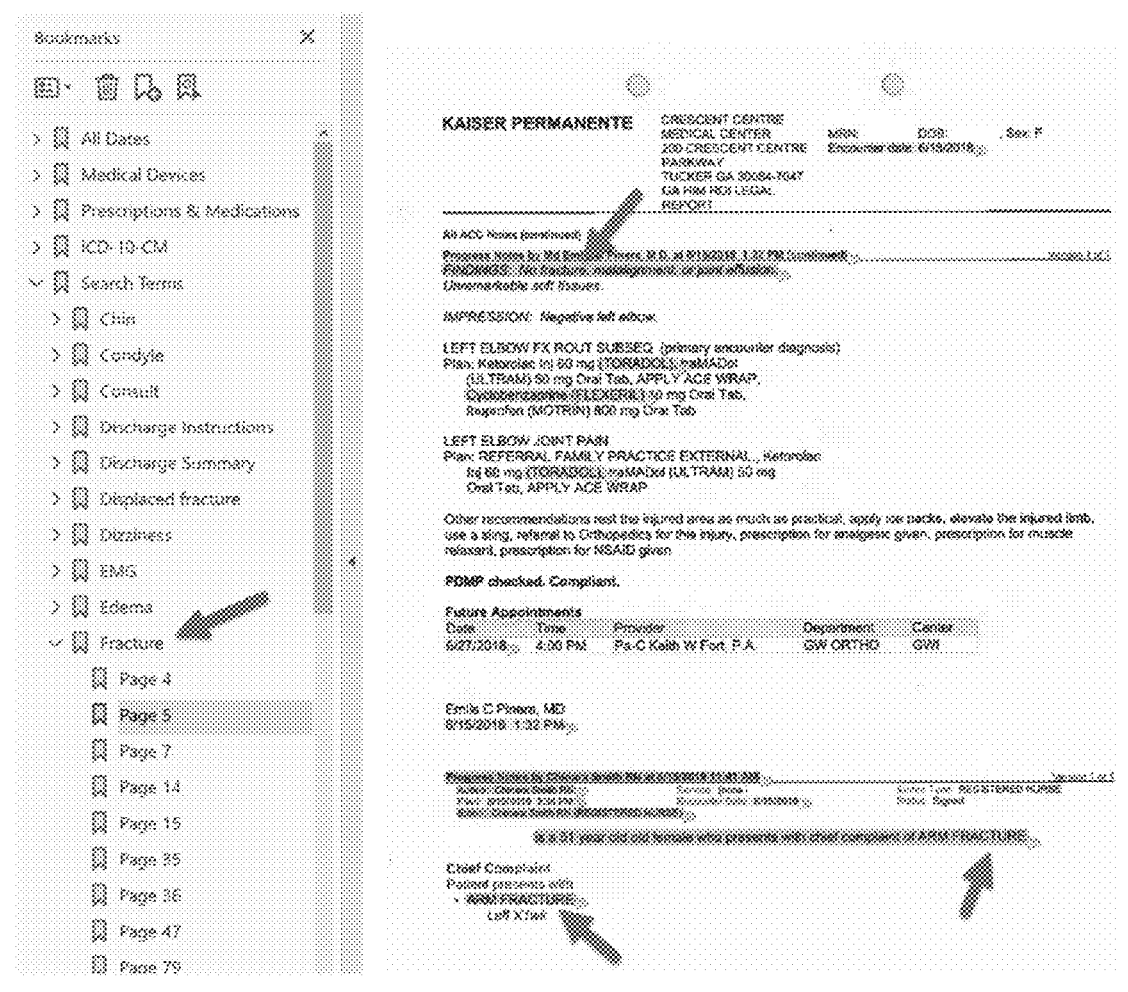

Once the identification and extraction of textual data from an image of a document is complete, the DA computing device, in at least one embodiment, may identify any combination of custom terms or phrases. Additionally, based on these identifications, the DA computing device may automatically annotate, bookmark, and/or highlight all uses of the custom terms within the original document image. See FIG. 4, for example. Additionally, or alternatively, the DA computing device may be further implemented to automatically export specific data, such as billing codes, along with informational data, such as corresponding page numbers, dates, descriptions, charges, or the like, directly to a spreadsheet, such as an Excel spreadsheet. Further, all charges within a record may be calculated. FIG. 5A illustrates an originally scanned document, such as a PDF file. FIG. 5B illustrates a spreadsheet, as described above, providing an example spreadsheet file including specific data (e.g., page number, date, code, type, description, and amount).

Figure 7:
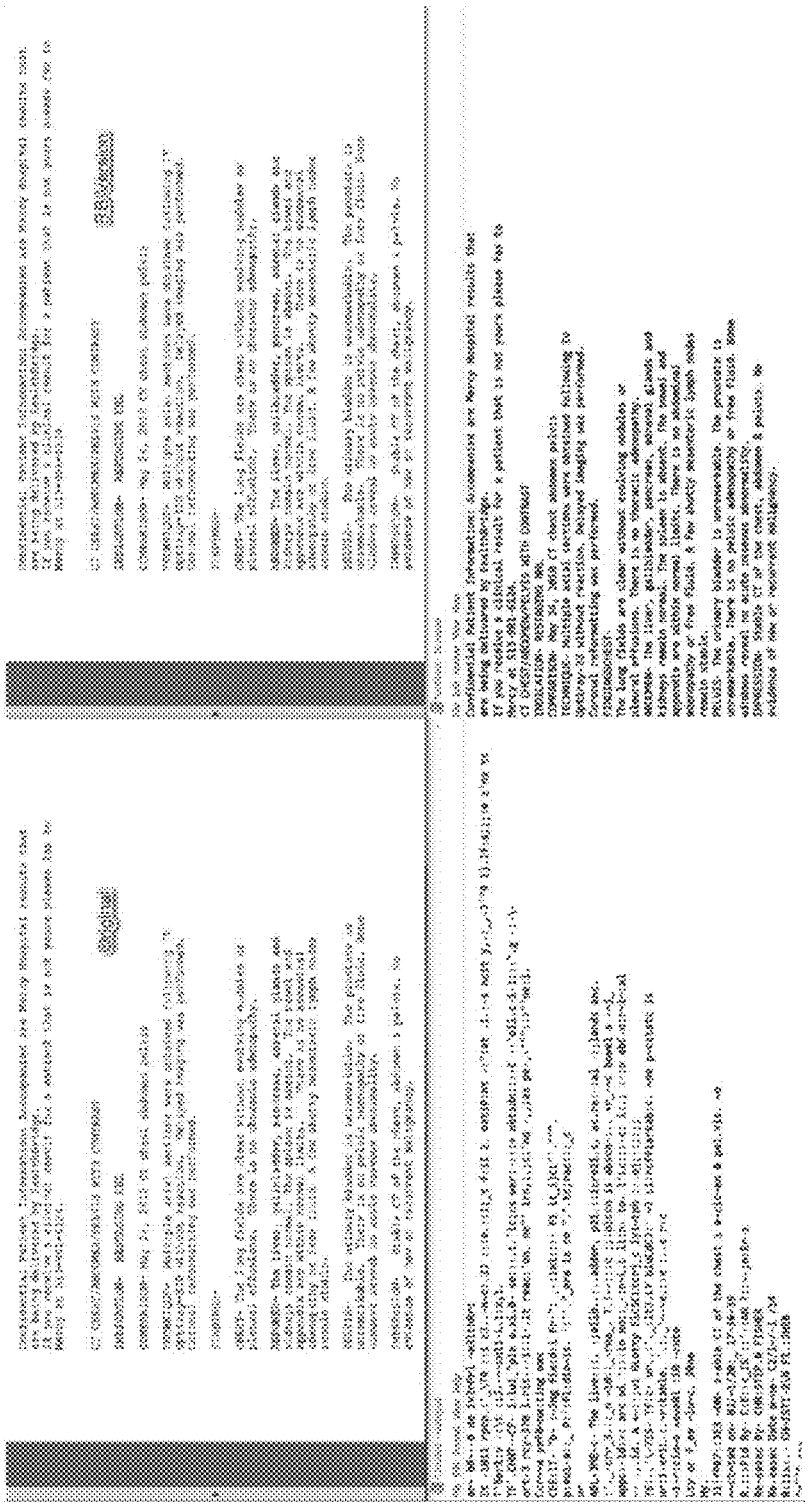
FIG. 7 illustrates an example enhanced document generated from an original by the DA system illustrated in FIG. 1.

As shown in FIG. 6, DA computing device provides methods and systems for identifying handwriting in a source image file, or PDF. Further, identified data may be automatically annotated and highlighted in accordance with custom terms to be identified as specified. Additionally, or alternatively, DA computing device may create a new copy of the original document and replace an existing OCR layer with a highly accurate version that includes searchable handwriting and text data. See FIG. 7.

Figure 8:
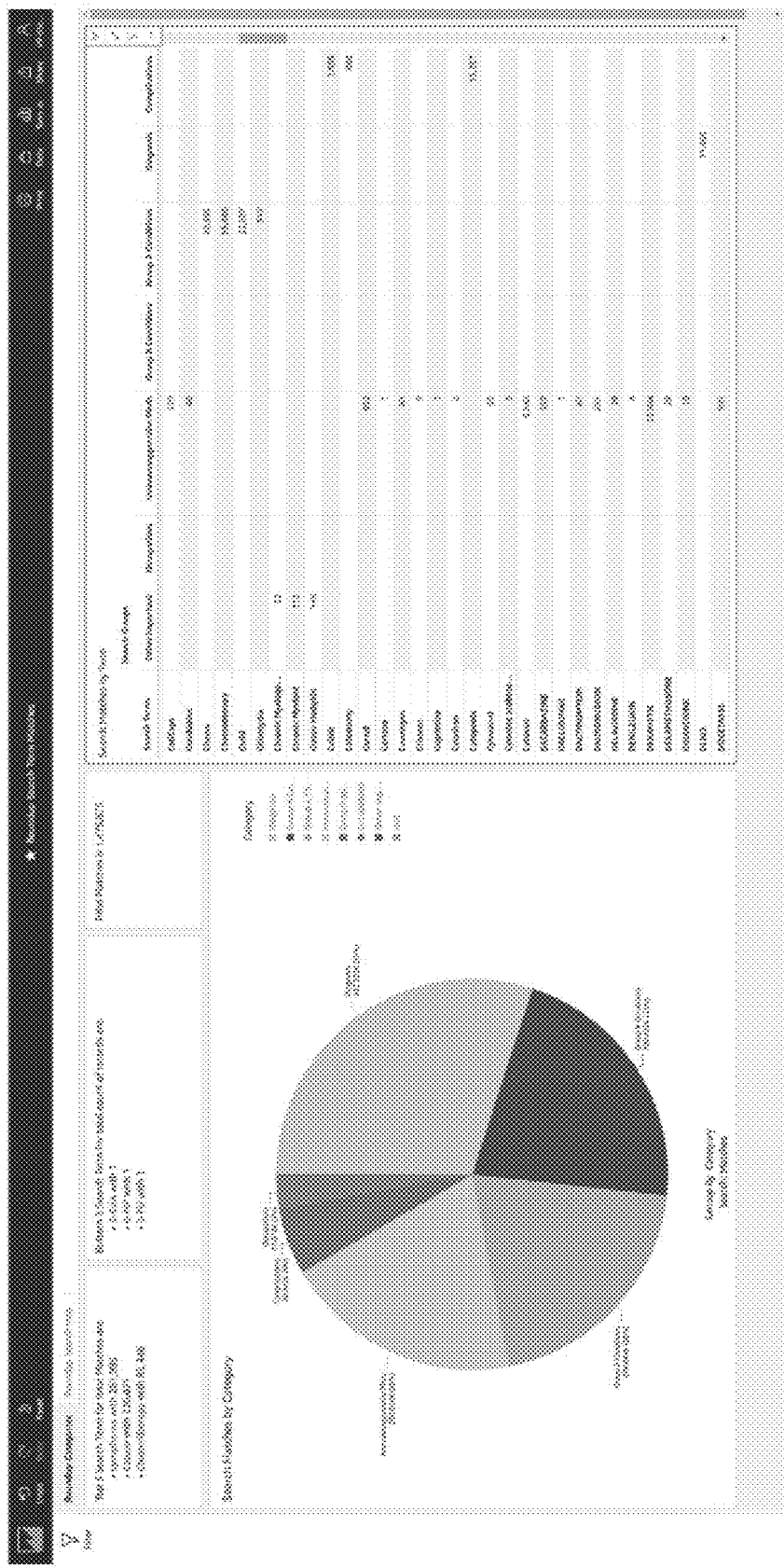
FIG. 8 illustrates an example web-based report generated by the DA system illustrated in FIG. 1.

As shown in FIG. 8, DA computing device may provide customizable web-based reporting of data. Data identified during the text extraction process, in at least one embodiment, may be stored in a database, such as database 106 shown in FIG. 1. In some embodiments, the web-based reporting may be provided via real-time access to the database and shown on a display of the requesting user via a graphical user interface.

In some embodiments, source files may be provided to a web portal provided by the DA computing device 102. Additionally, or alternatively, source files may be submitted through an API of DA computing device 102. Even further, source files may be retrieved by DA computing device 102 from a cloud-based file service (e.g., OneDrive, Google Drive, Dropbox, etc.). DA computing device does not require any traditional OCR processing before performing its own identification and extraction process.

In some embodiments, DA computing device may provide data protection. For example, DA computing device may store documents and relevant data in a secure manner using AES-256 encryption or the like. Further, DA computing device may configure SSL encryption between client devices (e.g., client devices 108 of FIG. 1) and DA computing device, for example. Even further DA computing system 100 may implement privacy rules, such as HIPAA.

In some embodiments, DA computing device 102 may perform an enhanced OCR process (optical character recognition) to identify all information on a page accurately. The process of identifying information on a page may be called "learning" and is one of many steps that ultimately provide a reliable method for searching information.

Unlike traditional OCR methods, the methods described herein leverages AI technologies and machine learning to accurately identify information on an image before cleaning and loading it into a database where it can be searched and analyzed. In some embodiments, the OCR process implemented herein my utilize AWS Textract, for example. Once loaded into the database, DA computing device may recreate the original content as a PDF by combining an image of the original page and textual content identified and saved in the database. During combination, each identified character of the textual content is placed in the same location, or mapping, of the source character of the original. Each identified character is made to be the same font (e.g., Times New Roman) and each identified character takes up the same amount of space on the page as the original source text character. Further, each identified character may then be made invisible to the naked eye. For example, the opacity level of textual content may be set to zero (0). Once all extracted and identified character data has been added, an image capture of the original source file. This ensures that while the textual data is not visible, a user may still be able to select the textual content. The process of incorporating a page image with the invisible and searchable textual content enables a user to think they are selecting text as it was originally presented, for example, a handwritten note, but in actuality they are actually selecting the invisible text. This technique dramatically improves the accuracy of the searchable content of the document, as shown in FIG. 9.

Figure 10A:
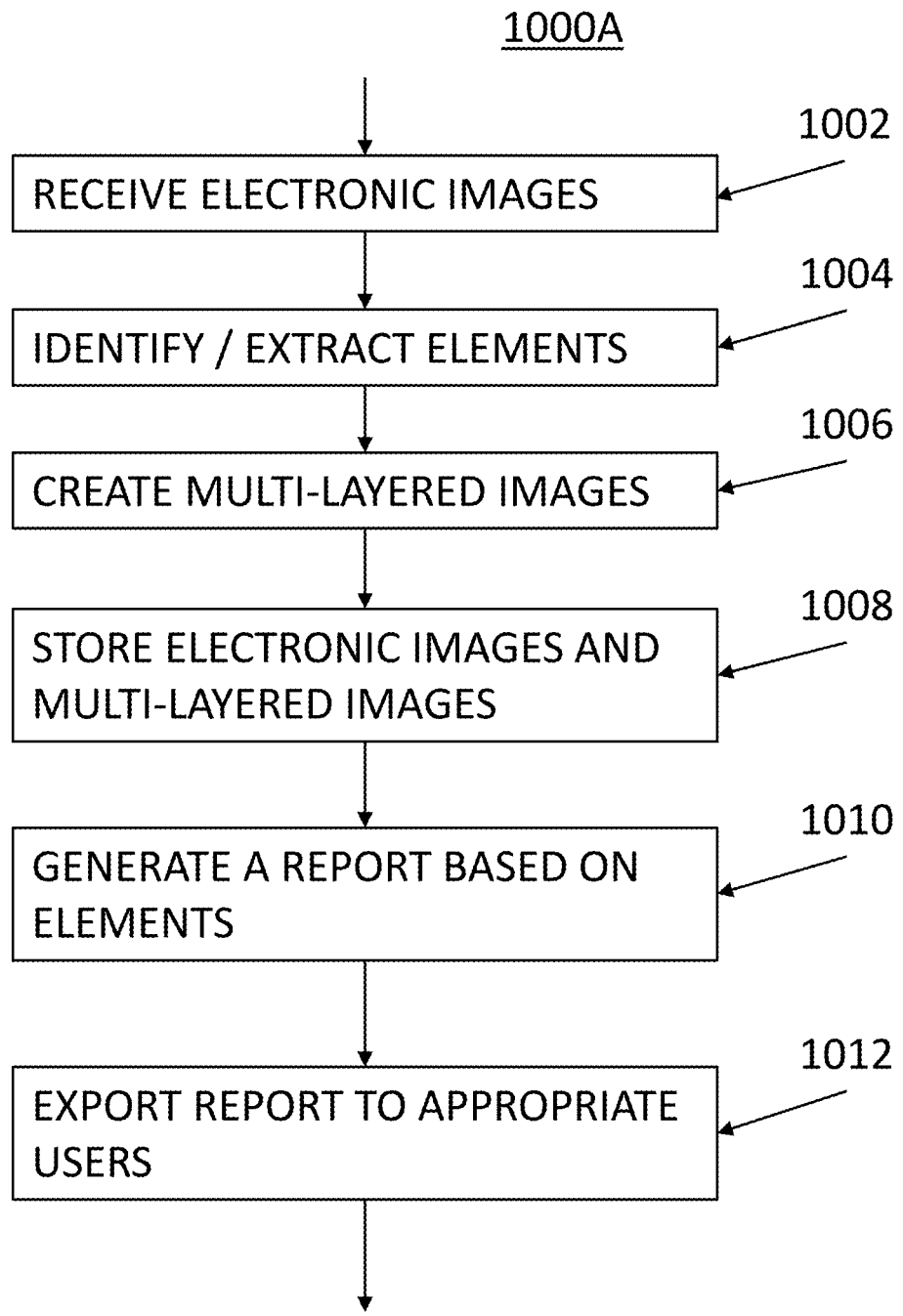
FIGS. 10A-10D illustrate exemplary embodiments of the disclosed.

FIG. 10A illustrates an exemplary method 1000A of for the review of sensitive data records. Method 1000A may be performed by DA computing device 102 (shown in FIG. 1).

The sensitive data records may be stored within a storage device associated with DA computing device 102, such as database 106.

Method 1000A may include receiving 1002 electronic images associated with at one or more users. In some embodiments, the electronic images may be received from a web portal, a web application or "app", an API, or a cloud-based file service, for example. The electronic images may be one or more of PDF files, Word files, PNG files, JPG files, or a combination thereof, for example. Additionally, in some embodiments, the electronic images may include medical health records data associated with some of the one or more users.

Method 1000A may include identifying and extracting 1004 one or more data elements from the one or more electronic images. In some embodiments, the one or more data elements may be identified and extracted using artificial intelligence (AI), machine learning (ML), or a combination thereof. For example, accurate interpretation of data elements found within the electronic images is made possible using AI and ML. Using AI and ML, DA computing device 102 may recognize and capture all printed and handwritten content from the electronic images. In some embodiments, during identifying and extracting, additional features may include the identification of poor-quality pages, dates of varying formats (e.g., mm/dd/yyyy, yyyy-mm-dd, etc.), custom terms or phrases, medical codes (e.g., billing, diagnostic, procedure), and generic and brand name drug, for example.

Method 1000A may include creating 1006 multi-layered images that correspond to the electronic images. In some embodiments, the multi-layered images may be created by layering the identified data elements and images of the original document. Further, the data elements may be positioned directly on top of corresponding locations of the document image. Additionally, or alternatively, each data element may represent a single character. In this example, each data element may be positioned to the same location of the original character of the image. For example, when a cursive "H" (e.g., H) is identified, a searchable layer is overlaid having a transparent "H" in a common font, such as Helvetica, or the like. Additionally, the multi-layered images may provide the ability to search an entire document, based on the one or more electronic images and the one or more elements, where the one or more multi-layered (ML) images correspond to the one or more electronic images. The method 1000A may further include storing 1008 the document and corresponding images on a storage device, such as database 106 of FIG. 1, for example.

Method 1000A may further include generating 1010 a report based, at least in part, on the one or more elements and corresponding metadata and exporting 1012 the report to at least one administrator associated with the corresponding one or more users. Alternatively, the report may be exported to querying users. The elements may include such data like billing codes. Metadata may include, but is not limited to page numbers, dates, descriptions, charges, and total charges of the report.

Figure 10B:
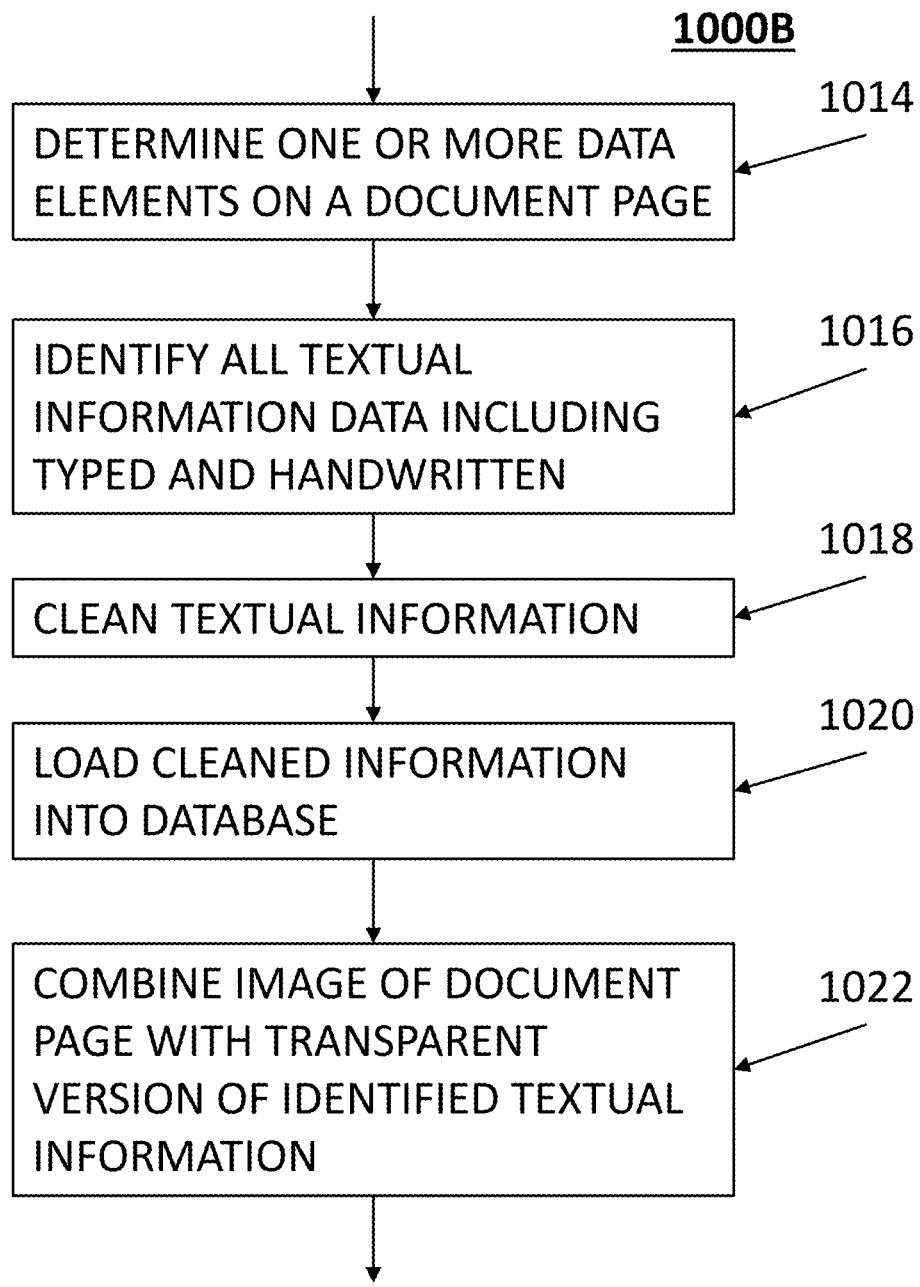

FIG. 10B illustrates an exemplary method 1000B that may be implemented to create a multi-layered image. For example, method 1000B may include determining 1014 data elements in a document or image. Data elements may include characters, handwritten data, text data, numbers, etc. Method 1000B may further include identifying 1016 all textual information of the one or more elements on the one or more images including handwritten and typed textual information. Method 1000B may further include cleaning 1018 and loading 1020 all the identified textual information onto a database, such as database 106 of FIG. 1, for example. Additionally, method 1000B may include combining 1022 a page image of the one or more electronic images with the identified textual information. During combining, character data may be set to a transparent font type. Further, the character data may correspond to a bounding box of the corresponding character of the one or more elements. Additionally, the bounding box may include bounding box coordinates and size and the identified textual information font size for each character is reduced until the character fits within the corresponding bounding box coordinates and size of the one or more elements.

Figure 10C:
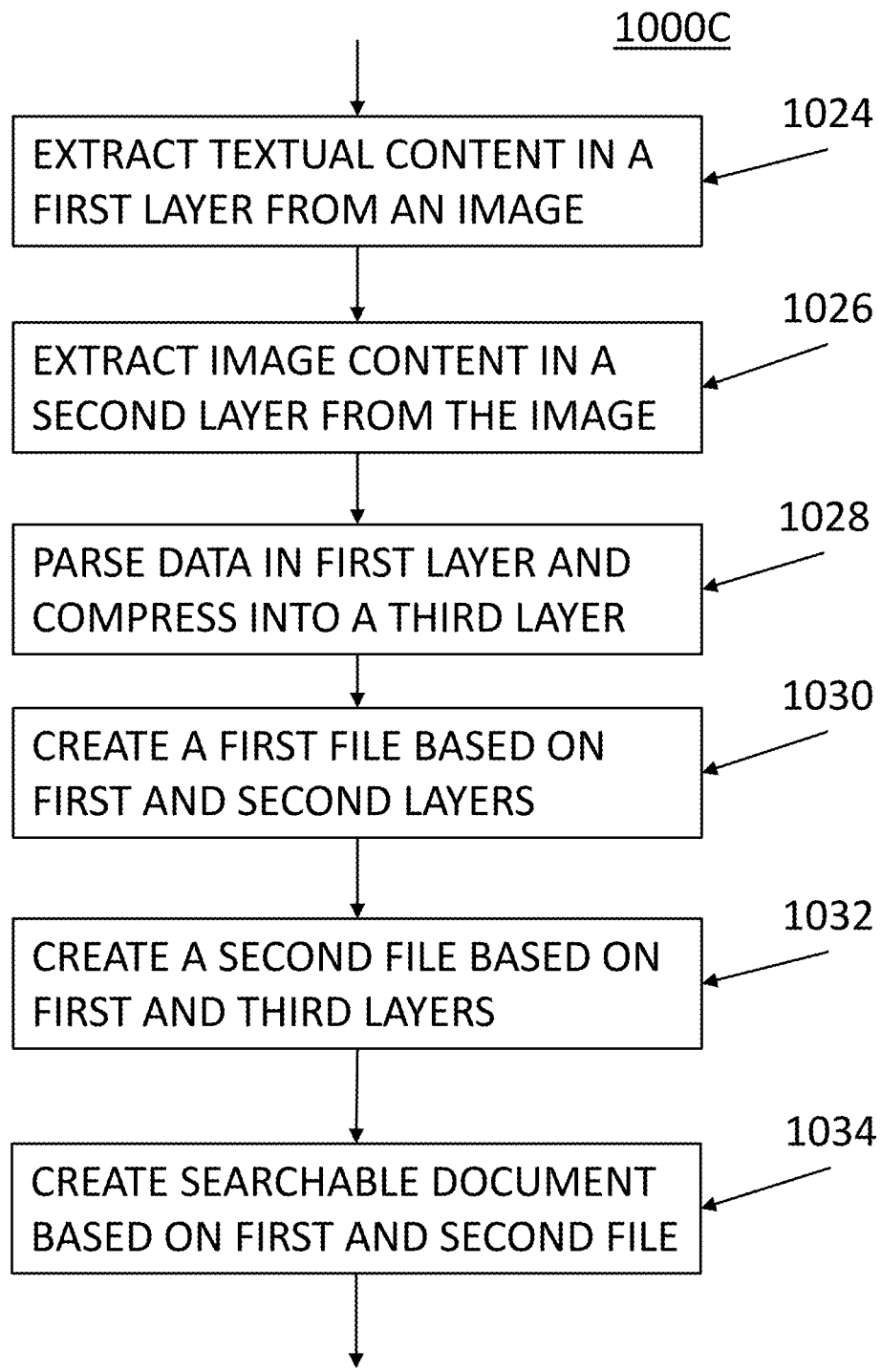

FIG. 10C illustrates a method 1000C for the machine translation of a document by a device, such as device 102 of FIG. 1. The method 1000C may include the step to extract 1024 textual content from a first layer of a document. Further, method 1000C may include the step to extract 1026 image data from a second layer of a document. In step 1028, data may be parsed in a first layer and compressed into a third layer. In step 1030, a first file may be created based on the first and second layers. In step 1032, a second file may be created based on the first and third layers. Finally, in step 1034, a searchable document may be created based on first and second files.

Figure 10D:
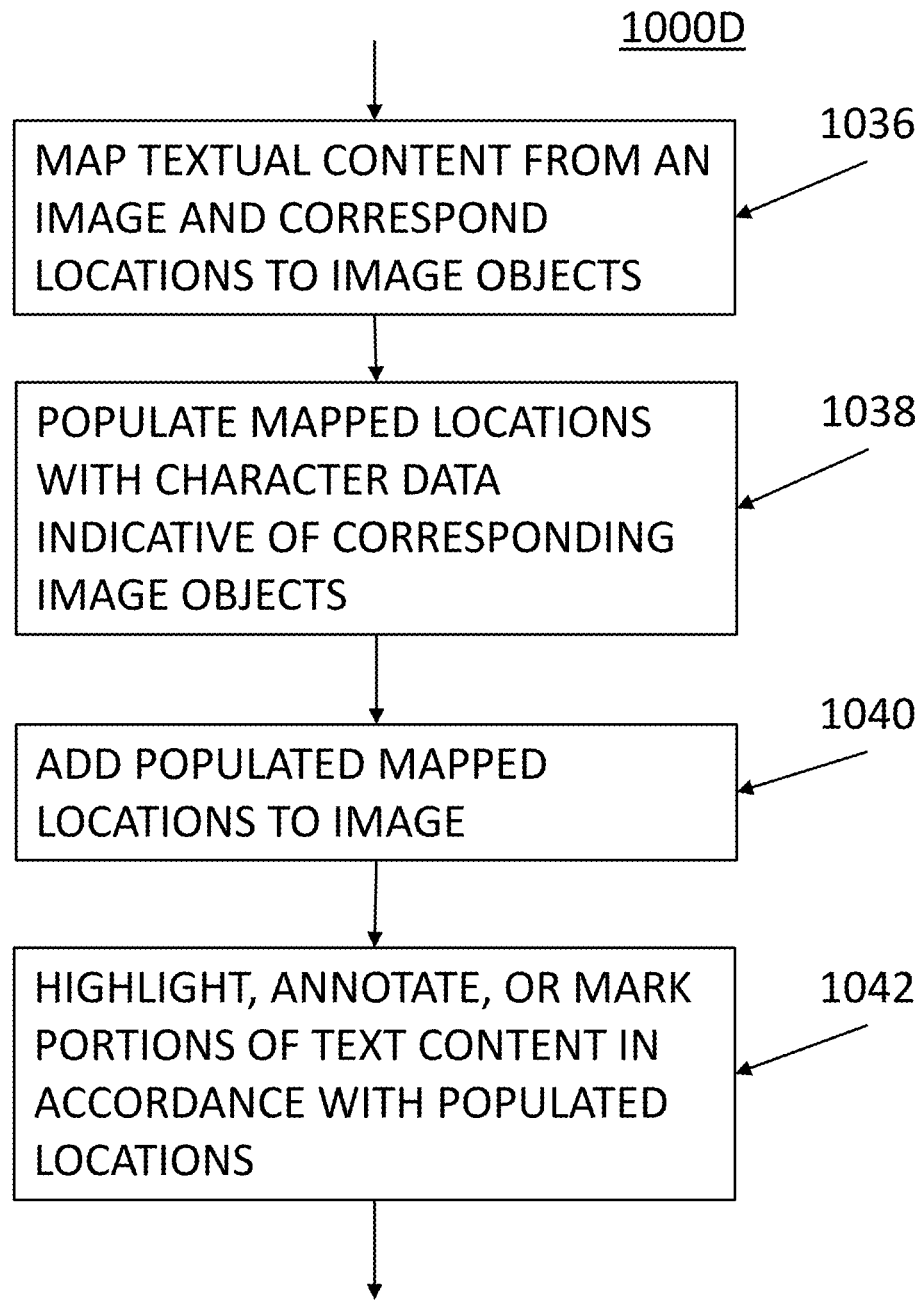

FIG. 10D illustrates a method 1000D for the machine translation of a document. The method may include mapping 1036 mapping textual content from an image to create a plurality of mapped locations correspondent to at least one object from the image. In step 1038, each of the mapped locations may be populated with at least one character indicative of the object, each character sharing at least one similar attribute. In step 1040, the image may be added to the populated mapped locations. In step 1042, annotations and highlighting may be added to the document. For example, step 1042 may include highlighting at least a portion of the textual content in accordance with the populated at least one character. In some embodiments, at least one similar attribute is font type.

Improving Searchable Layers in PDFs

The DA computing device 102 may use a combination of third-party software, data analysis, regular expressions, data cleaning, image manipulation, and custom programming to convert any image, PDF, or Word document into a searchable PDF that is more accurate than traditional OCR methods. The use of AWS Textract and the subsequent creation of an improved searchable PDF involves many steps described in the outline below.

The DA computing device may take full advantage of all CPU cores available on the server during the OCR process by implementing forking and multithreading in any areas where it can improve processing rates. Each page may be forked as a separate job and assigned to a single CPU core. The process continues until all CPU cores actively process pages and the maximum number of concurrent Textract jobs has been reached. Additional page jobs are queued until they can be processed. Multithreading during image conversion and optimization helps reduce processing time.

OCR Processing Steps

In some embodiments, systems and methods may be provided for the optical character recognition (OCR) of textual data within a document. The document may be uploaded onto a certain storage database, either local or remote. An OCR processing of a document may be restarted, such as resetting a processing status of the document. The status may be tracked, such as in a record that corresponds to the document and stored within a storage database, such as database 106 of FIG. 1. In some embodiments, uploaded documents may be converted into a common file type. For example, uploaded documents may be of varying file types, such as image or word processing file types. In this embodiment, the uploaded documents may be converted to the same file type, such as a PDF, or the like. Additional information about documents may be identified or collected and stored in a storage device, such as database 106 of FIG. 1. For example, metadata, bookmarks, annotations, file history, author, permissions, processing job status, and other similar types of data may be stored.

In an example embodiment for identifying textual data in a document, the following steps may be followed: 1) initiate text extraction processing to extract textual content from the page, 2) identify all documents in a text extraction processing queue, 3) prioritize jobs from smallest page count to largest, 4) identify a matter number from a file name of the document and save to database, 5) clear database of old page records for the current document, 6) add new page records for every page of the current document, 7) clear all textual content and data from the database if it exists from previous processing, 8) begin tracking forked job ids for each page, 9) limit number of jobs, 10) regulate the page submission rate to the text extraction processor, 11) limit maximum number of pages to process simultaneously, 12) fork page processing job, 13) initiate new database connection, 14) update page processing queue to indicate job started for the current page, 15) extract next PDF page as a pure B/W PNG image, 16) perform downscaling to retain image quality, 17) use multithreading to improve performance, 18) fit all content to a page (e.g., 8.5×11-inch page) in either portrait or landscape, 19) resample at 600 dpi, 20) verify page does not exceed the maximum file size (e.g., 5 MB), 21) log error to the database if a page exceeds maximum size, 22) instantiate new text extraction client, 23) instantiate new client, 24) reset retry counter, 25) submit document to text extraction processor, 26) continue to resubmit job using exponential backoff with jitter, 27) log page as an error if exceeded maximum retries, 28) receive and parse JSON data containing textual content for the page, 29) load page data and textual content into the database, 30) clean data, 31) stripe non-alphanumeric characters, 32) sandwich words and lines for each raw value, 33) create indexes for clean and raw versions of all words and lines, 34) submit textual content for the page to further database, 35) query database for text extraction data and create text blob using position on the page, 36) receive and parse JSON data containing entities (e.g., medical entities) into the database, 37) recreate document with enhanced searchable layer, 38) initiate new files (e.g., PDF), 39) create new document with graphics and enhanced OCR, 40) create a new document with transcribed text and no graphic elements 41) load original file for page to determine page dimensions, 42) add a new landscape page to each document if the width in points is greater than the height, 43) add a new portrait page to each document if the height in points is greater than the width, 44) get word content from text extraction results previously saved to the database, 45) get all textual content, including handwriting, 46) get bounding box coordinates for each textual content (e.g., character, word) from the database, 47) set initial font, 48) set font type (e.g., Helvetica), 49) set maximum font size (e.g., 128 points), 50) set page transparency to the maximum to hide the text layer, 50) gradually reduce the font size until each textual content fits within the original bounding box size, 51) write the word to the transparent page of the document, 52) get line content from text extraction results previously saved to the database, 53) get all textual content, including handwriting, 54) get bounding box coordinates for each line from the database, 55) set initial font, 56) set font type (e.g., Helvetica), 57) set font size (e.g., 8 points), 58) set page transparency to full visibility to show text layer, 59) write OCR and transcribed documents files, 60) stamp page image onto newly saved OCR document containing transparent layer, 61) save stamped document file for this page, 62) apply compression (e.g., JBIG2 lossy) and optimization to the saved document, 63) check for additional pages to process, go to step 3 for next in the queue for this document, 64) merge all pages for OCR version of document if all pages complete, 65) merge all pages for the transcribed version of document if all pages complete, 66) get all textual content by the line from the database for this page, 67) save all line content to the new text file, upload all files to an encrypted container on a storage device, 68) save OCR document containing images on a storage device, 69) save transcribed document containing no images on a storage device, 70) save transcribed text file on a storage device, 71) update database to show document processing complete, 72) cleanup local files no longer required after processing completes, 73) make document available for searching by the user in the web application. These steps may be performed, for example, in conjunction with steps detailed above in FIGS. 10A-10D.

After the DA computing device completes the OCR Processing steps described above, the document may then be searched for relevant data. The searching and identification information may include bookmarking, highlighting, and annotating the newly created PDF.

Document Markup Steps

The following example steps may be performed by the DA computing device when identifying, highlighting, and annotating a document, such as a PDF document, using text data stored in database, such as database 106 of FIG. 1.

In one exemplary embodiment, identifying, highlighting, and annotating may include, but is not limited to: 1) initiate batch search job, 2) identify all documents included in the search job, 3) retrieve document from storage, 4) retrieve OCR file if it exists; otherwise, retrieve original, and 5) determine search types for batch job. In some embodiments, certain codes may be retrieved, such as ICD 9/10 diagnostic and procedure codes from an FDA database or CPT & HCPCS billing codes from an AMA database, for example.

In some embodiments, a summary of medical events may be provided using an external knowledge base, such AWS Medical Comprehend, or the like. A summary of a document may include, but is not limited to, conditions, page number, acuity, direction of injury, system organ site, diagnosis, signs, symptoms, negations, medications, dosage, duration, form, frequency, rate, route or mode, strength, chronology, date, procedure, test, treatment, condition, FDA drugs (named brand and generic), FDA devices (named brand and generic including model numbers), dates in various formats, pages containing poor quality text or handwriting, protected health information, addresses, ages, emails, ID numbers, names, phone or fax numbers, URLs, custom search terms, phrases, and acronyms.

In some embodiments, a database, such as database 106 of FIG. 1, may be initiated for matching purposes. One or more datasets may be preloaded into the database for initiation. The one or more datasets may include, for example, ICD information, drugs data, device data, billing codes data, or the like. Additionally, pattern matching may be used, for example, such as regex pattern matching. A listing of user-specific information may be maintained. In this embodiment, user-specific data may be used to define certain word groups to provide custom search ability. User-specific information may be limited to, or associated with, a single user. Alternatively, user-specific information may be associated with multiple users. During a user search, an external resource may be accessed to generate a summary report as part of search results. For example, the summary may be a medical summary received from a medical database. In response to a search, a multi-layered document, as described above, may be marked up and displayed to a user in response to a search query. A document may include one or more annotations, bookmarks, highlighted portions, or the like. In some embodiments, because of a search query, a new bookmark category may be created with respect to a search or search type. Additionally, or alternatively, a highlight color (e.g., blue, yellow) may be selected based on a determined search type. Other types of data may be provided in response to a search, such as, for example, a name of matching term or phrase, the addition of unique page numbers contain at least one match, highlighting of all lines on a page matching a certain term or phrase, and a check for simple highlight or full highlight with annotation.

Further, with respect to highlighting abilities, in order to provide accurate highlighting of data, the following steps may be performed: 1) get bounding box coordinates surrounding line containing matched content, 2) determine page and text orientation, 3) recalculate bound box coordinates based on the orientation of page and text, 4) highlight line or annotate with details about the match, 5) proceed to the following document until all files in the batch are complete, and 6) save batch file. Additionally, all generated documents may be packaged, such as in a ZIP file, or the like, and stored on a storage device. Further, a user may be notified, such as via email or text message for example, that a search report is ready for review. The notification transmission may include a download link or the file itself.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by DA computing device 102, for example, to identify patterns between initial and subsequent feedback provided by entities, such as clients or agencies, and in view of recommendations made by the DA computing device 102. Accordingly, the systems and methods described herein may use machine learning algorithms for both pattern recognition and predictive modeling.

Exemplary Embodiments

In one aspect, a device for the machine translation of a document may be provided. The device may comprise of at least one processor in communication with a memory device, the memory device storing instructions that, upon execution, cause the processor to: extract textual content in a first layer of context from an image, extract imaging content in a second layer of context from the image, parse JSON data in the first layer of context and compress the textual content into a third layer of context, create a first file in accordance with the first and second layers of context and create a second file in accordance with the first and third layers, and create a single unified searchable document from at least a portion of the first file and second file.

In another aspect, a method for the machine translation of a document may be provided. The method may include the use of a processor and a memory. The method may include mapping textual content from an image to create a plurality of mapped locations correspondent to at least one object from the image, populating each of the mapped locations with at least one character indicative of the object, each character sharing at least one similar attribute, adding to the image the populated mapped locations, and highlighting at least a portion of the textual content in accordance with the populated at least one character.

A further enhancement of the method may include wherein the at least one similar attribute is font type.

A document analysis (DA) computing device for the review of sensitive data records may be provided. The DA computing device may comprise of a memory in communication with a hardware processor. The hardware processor may be configured to: receive one or more electronic images associated with one or more users of a plurality of users, identify and extract one or more elements of the one or more electronic images, and create, based on the one or more electronic images and the one or more elements, one or more multi-layered (ML) images that correspond to the one or more electronic images.

A further enhancement of the he DA computing device may include wherein the hardware processor is further configured to: store, on the at least one memory, the one or more electronic images.

A further enhancement of the DA computing device may include wherein the one or more electronic images are stored using AES-256 encryption.

A further enhancement of the DA computing device may include wherein the one or more elements are identified and extracted using artificial intelligence, machine learning, or both.

A further enhancement of the DA computing device may include wherein the one or more elements include one or more combinations of custom terms or phrases, and wherein the custom terms or phrases or emphasized in the one or more ML images, wherein the custom terms or phrases are emphasized by one or more annotations, bookmarks, or highlights.

A further enhancement of the DA computing device may include wherein the custom terms or phrases are user-defined.

A further enhancement of the DA computing device may include wherein the hardware processor is further configured to: generate a report based, at least in part, on the one or more elements and corresponding metadata, and export the report to at least one administrator associated with the corresponding one or more users.

A further enhancement of the DA computing device may include wherein the one or more elements include one or more billing codes.

A further enhancement of the DA computing device may include wherein the metadata includes one or more of page numbers, dates, descriptions, charges, and total charges of the report.

A further enhancement of the DA computing device may include the one or more ML images are created by: identifying all textual information of the one or more elements on the one or more images including handwritten and typed textual information, cleaning and loading all the identified textual information onto a database, and combining a page image of the one or more electronic images with the identified textual information.

A further enhancement of the DA computing device may include wherein, during the combining, each character of the identified textual information is set to a transparent font type and font size that corresponds to a bounding box of the corresponding character of the one or more elements.

A further enhancement of the DA computing device may include wherein the bounding box includes bounding box coordinates and size and the identified textual information font size for each character is reduced until the character fits within the corresponding bounding box coordinates and size of the one or more elements.

A further enhancement of the DA computing device may include wherein the one or more electronic images are received from a web portal, an API, or a cloud-based file service.

A further enhancement of the DA computing device may include wherein the one or more electronic images are received from a cloud-based file service.

A further enhancement of the DA computing device may include wherein the one or more electronic images comprise one or more of PDF files, Word files, PNG files, JPG files, or a combination thereof.

A further enhancement of the DA computing device may include wherein the plurality of electronic records are medical health records.

In another aspect, a document review platform for improving the review of medical records may be provided. The platform may comprise of at least one computing device having a memory communicatively coupled to a hardware processor. The document review platform may comprise of a compilation of services for identifying, extracting, and assessing electronic images using a layered approach.

Additional Considerations

It is appreciated that exemplary DA computing system 100 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for transforming documentation in a computing device, the method comprising:
   receiving, by the computing device, a request from a user to transform a document; storing, by the computing device, an original copy of the document and documentation details associated with the document to a database;
   extracting, using a Web service, textual content from each page of the document; identifying information about the extracted textual content from each page of the document;
   creating an invisible and searchable layer of each page the document based on the extracted textual content;
   combining, for each page of the document, an image of the original copy of the document with the corresponding invisible and searchable layer of the document to create a searchable version of the document;
   storing the searchable version of the document and the identified information to the database for subsequent retrieval; and
   wherein, for each word of the extracted textual content and each page of the document, creating the invisible and searchable layer further comprises:
   determining original bounding box size and bounding box coordinates for each word of the extracted textual content based on the identified information;
   setting the page transparency of the page to maximum;
   reducing, gradually, the font size until the word fits within the original bounding box size; and
   writing the word to the page based on the bounding box coordinates of the page.

2. The method of claim 1, wherein, for each word of the extracted textual content and each page of the document, creating the invisible and searchable layer further comprises:
   determining original bounding box size and bounding box coordinates for each word of the extracted textual content based on the identified information;
   setting the page transparency of the page to maximum;
   reducing, gradually, the font size until the word fits within the original bounding box size; and
   writing the word to the page based on the bounding box coordinates of the page.

3. The method of claim 1, wherein the source document includes one or more of electronic medical records, diagnostic and procedure codes, billing codes.

4. The method of claim 1, further comprising:
   identifying one or more custom terms or phrases in the searchable version of the document;
   wherein the one or more custom terms or phrases are included in the request from the user.

5. The method of claim 1, further comprising: identifying one or more custom terms or phrases in the searchable version of the document; wherein the one or more custom terms or phrases are included in the request from the user.

6. The method of claim 1, wherein the document includes one or more electronic medical records, diagnostic and procedure codes, and billing codes.

7. The method of claim 1, wherein the extracting and identifying information from the document uses artificial intelligence, machine learning, or both.

8. The method of claim 1, wherein the request is received via a web portal, an application programming interface (API}, or a cloud-based file service.

9. The method of claim 1, wherein the textual content includes printed text and handwritten content.

10. The method of claim 1, wherein creating the invisible and searchable layer of each page of the document further comprises:
    setting a page transparency to maximum.

11. The method of claim 1, wherein the database is preloaded with one or more datasets.

12. The method of claim 1, wherein the one or more datasets include interface control documents (ICD}, medications, medical devices, and billing codes.

13. The method of claim 1, further comprising: identifying one or more pages of the document that include low-quality text or-low-quality handwriting.

14. A system for transforming documentation in a computing device, the system comprising:
- a graphical user interface capable of receiving a request from a user to transform a document stored on a non-transitory computer readable storage medium;
- at least one network port for receiving a source document and at least one document attribute;
  - a database for recording the extraction of textual content from at least one page of the source document;
  - a rules engine for identifying information about the extracted textual content and creating a hidden and searchable layer on at least one page of the source document based on the extracted textual content;
  - a data layer for receiving a searchable version of the source document and the identified information wherein an image of the source document with the corresponding hidden and searchable layer of the document are merged to create a searchable version of the documents and
- wherein the creating the hidden and searchable layer further comprises: determining original bounding box size and bounding box coordinates for each word of the extracted textual content based on the identified information;
- setting the page transparency of the page to maximum;
- reducing, gradually, the font size until the word fits within the original bounding box size; and
- writing the word to the page based on the bounding box coordinates of the page.

15. The system of claim 14, wherein the source document includes one or more of electronic medical records, diagnostic and procedure codes, billing codes.

* * * * *

UNITED STATES PATENT AND TRADEMARK OFFICE
CERTIFICATE OF CORRECTION

Page 1 of 1

PATENT NO. : 12,374,148 B2
APPLICATION NO. : 17/855495
DATED : July 29, 2025
INVENTOR(S) : David Lewis It is certified that error appears in the above-identified patent and that said Letters Patent is hereby corrected as shown below:

On the Title Page

In item (73), in Assignee, delete "Digital Medical Records, LLC, Philadelphia, PA (US)" and insert therefor -- "Digital Legal Medical Records, LLC, Philadelphia, PA (US)" --

Signed and Sealed this
Twenty-third Day of December, 2025

John A. Squires
*Director of the United States Patent and Trademark Office*